(12) United States Patent
Cavus et al.

(10) Patent No.: US 11,941,437 B2
(45) Date of Patent: Mar. 26, 2024

(54) GRAPH PARTITIONING TO EXPLOIT BATCH-LEVEL PARALLELISM

(71) Applicant: Intel Corporation, Santa Clara, CA (US)

(72) Inventors: Mustafa Cavus, Hillsboro, OR (US); Yamini Nimmagadda, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 17/358,751

(22) Filed: Jun. 25, 2021

(65) Prior Publication Data

US 2021/0318908 A1    Oct. 14, 2021

(51) Int. Cl.
 *G06F 9/50* (2006.01)
 *G06F 9/48* (2006.01)
 *G06F 16/901* (2019.01)
 *G06N 3/04* (2023.01)
 *G06N 3/08* (2023.01)

(52) U.S. Cl.
 CPC .......... *G06F 9/4881* (2013.01); *G06F 9/5038* (2013.01); *G06F 16/9024* (2019.01); *G06N 3/04* (2013.01); *G06N 3/08* (2013.01)

(58) Field of Classification Search
 CPC .. G06F 9/4881; G06F 9/5038; G06F 16/9024; G06N 3/04; G06N 3/08; G06N 3/105
 See application file for complete search history.

(56) References Cited

U.S. PATENT DOCUMENTS

| | | | |
|---|---|---|---|
| 2018/0314934 A1* | 11/2018 | Ben-Avi | G06N 3/063 |
| 2019/0065162 A1* | 2/2019 | Thambidorai | G06F 8/47 |
| 2021/0064424 A1* | 3/2021 | Venkataraman | G06F 9/4881 |

(Continued)

OTHER PUBLICATIONS

Neubig et al., "On-the-fly Operation Batching in Dynamic Computation Graphs", (2017), 31st COnference on Neural Information Processing Systems, pp. 1-11 [retrieved from https://proceedings.neurips.cc/paper/2017/file/c902b497eb972281fb5b4e206db38ee6-Paper.pdf]. (Year: 2017).*

(Continued)

*Primary Examiner* — Brian W Wathen
(74) *Attorney, Agent, or Firm* — Jordan IP Law, LLC

(57) ABSTRACT

Systems, apparatuses and methods provide technology for batch-level parallelism, including partitioning a graph into a plurality of clusters comprising batched clusters that support batched data and non-batched clusters that fail to support batched data, establishing an execution queue for execution of the plurality of clusters based on cluster dependencies, and scheduling inference execution of the plurality of clusters in the execution queue based on batch size. The technology can include identifying nodes of the graph as batched or non-batched, generating a batched cluster comprising a plurality of batched nodes based on a relationship between two or more of the batched nodes, and generating a non-batched cluster comprising a plurality of non-batched nodes based on a relationship between two or more of the non-batched nodes. The technology can also include generating a set of cluster dependencies, where the cluster dependencies are used to determine an execution order for the clusters.

25 Claims, 10 Drawing Sheets

(56) References Cited

U.S. PATENT DOCUMENTS

2021/0255896 A1* 8/2021 Dong .................... G06F 9/4881
2022/0300416 A1* 9/2022 Hajewski ............ G06F 12/0269

OTHER PUBLICATIONS

A. Krizhevsky, "One weird trick for parallelizing convolutional neural networks," <arxiv.org/pdf/1404.5997.pdf>, Apr. 26, 2014, 7 pages.

M. Looks et al., "Deep learning with dynamic computation graphs," <arxiv.org/pdf/1702.02181v2.pdf>, Feb. 22, 2017, 12 pages.

G. Neubig et al., "Dynet: The dynamic neural network toolkit," <arxiv.org/pdf/1701.03980.pdf>, Jan. 15, 2017, 33 pages.

L. Song et al., "Hypar: Towards hybrid parallelism for deep learning accelerator array," <arxiv.org/pdf/1901.02067.pdf>, Jan. 16, 2020, 13 pages.

M. Wang et al., "Supporting very large models using automatic dataflow graph partitioning," <arxiv.org/pdf/1807.08887.pdf>, Feb. 20, 2019, 18 pages.

M. Wang et al., "Unifying data, model and hybrid parallelism in deep learning via tensor tiling," <https://arxiv.org/pdf/1805.04170.pdf>, May 10, 2018, 14 pages.

* cited by examiner

GRAPH PARTITIONING TO EXPLOIT BATCH-LEVEL PARALLELISM

TECHNICAL FIELD

Embodiments generally relate to computing systems. More particularly, embodiments relate to framework integration for deep learning systems.

BACKGROUND

Many of the popular deep learning frameworks such as TENSORFLOW, PYTORCH, ONNX RUNTIME, PADDLEPADDLE and others can work with different hardware (HW) acceleration libraries to execute the deep learning models on the hardware platform. Each framework may support an extensible interface that would help to integrate with the HW specific libraries. This interface enables flexibility for the application developers to deploy models in different environments in the cloud and the edge and optimize the execution of artificial intelligence (AI) models by taking advantage of the compute capabilities of the platform. These frameworks can work with the execution providers (EPs), which have the interface to allocate specific nodes or sub-graphs in an AI model for execution by the EP library in supported hardware. The EP libraries that are pre-installed in the execution environment process and execute the sub-graph of the model on the hardware. This architecture abstracts out the details of the hardware specific libraries that optimize the execution of deep neural networks across hardware platforms such as a central processing unit (CPU), graphics processing unit (GPU), field-programmable gate array (FPGA) or specialized application specific integrated circuit (ASIC).

A single framework today may be integrated with many other accelerated backend systems ("backends") for faster inferencing. For example, the ONNX Runtime package from MICROSOFT can be built with any combination of the execution provider along with a default CPU execution provider. The TENSORRT execution provider in the ONNX Runtime makes use of the TENSORRT Deep Learning inferencing engine from NVIDIA to accelerate the ONNX model in a family of GPUs. Similarly, the OPENVINO execution provider enables deep learning inference on CPUs, integrated GPUs and Vision Processing Units (VPUs) from INTEL. Framework integration of backends enables unsupported operators or a cluster of operators to be run on default runtimes and the rest of the supported graph to be run on an accelerated backend to obtain the best performance of the overall model on targeted hardware. If some operators in the model are not supported by an accelerated backend, then the corresponding deep learning framework will partition the graph and only send supported subgraphs to the accelerated backend, with the unsupported subgraphs falling back to the default backend from the framework.

Batching is a widely known optimization method in many deep learning applications. While using a batched input, a deep learning framework can utilize hardware resources to compute multiple input frames simultaneously by taking advantage of hardware capabilities like multi-threading, etc. Although most frameworks can handle execution of batched input using multi-threading, executing the inference task on multiple hardware units creates challenges to utilize all units for batched inputs. Currently, this requires manual programming efforts such as requiring the developer to split the data into smaller batches and manually assign concurrent inference execution instances for each hardware unit. Further, some graphs have additional inputs/outputs or operators that create additional difficulties in employing batch-level parallelism.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

An improved computing system as described herein provides technology to partition any graph autonomously to exploit data and model parallelism on multiple hardware units. The technology autonomously analyzes deep learning models and partitions them in a manner such that each partitioned section (or cluster) of the graph either fully supports batching or is not compatible with batching. Each cluster is either marked as batched (supports batched input/output) or non-batched (does not support batched input/output). After identifying and dividing the graph into smaller executable clusters, the technology can schedule multiple asynchronous inference executions on multiple hardware units to achieve greater performance without requiring any developer input.

Figure 1:
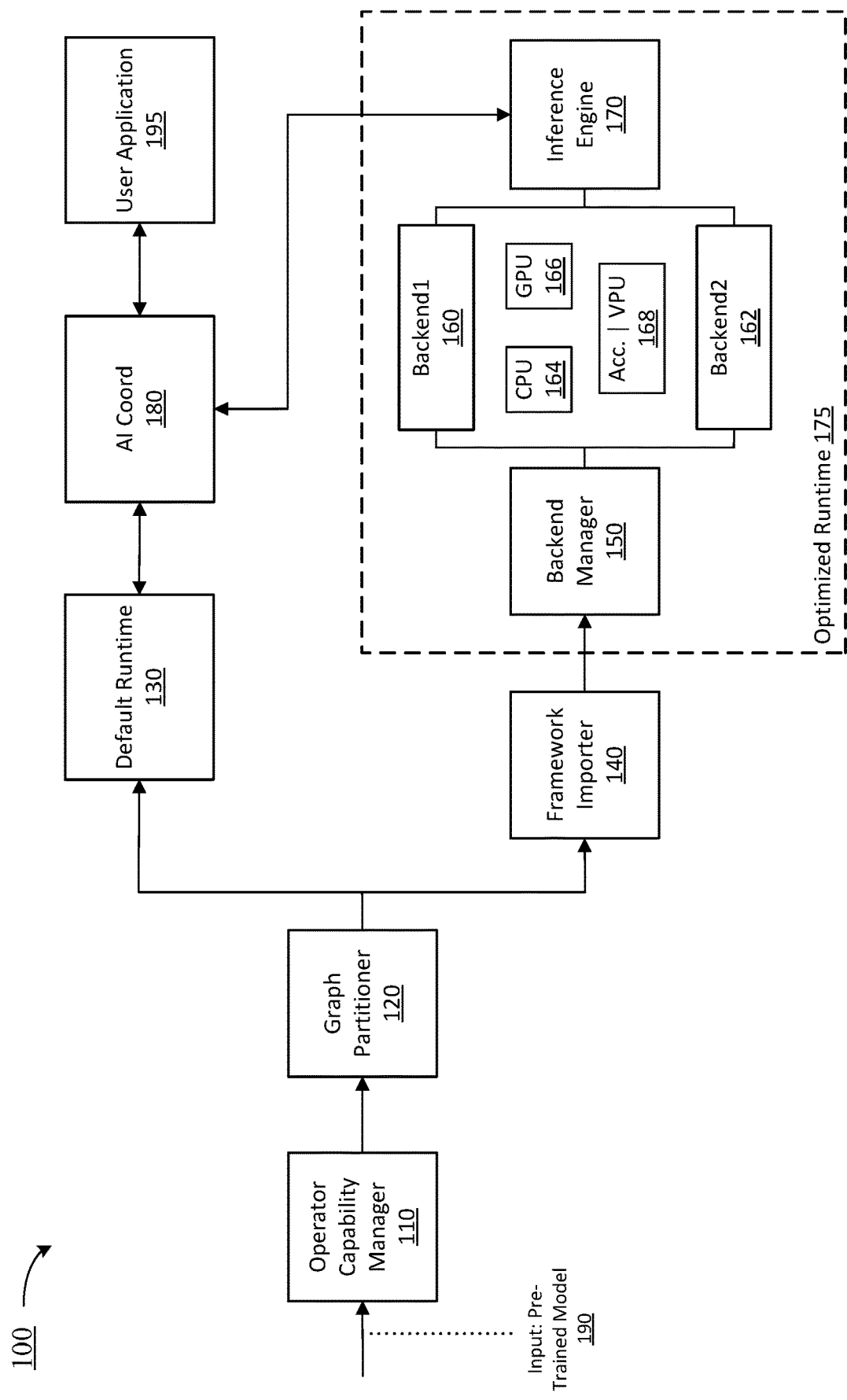
FIG. 1 provides a block diagram illustrating an example artificial intelligence (AI) framework integration system according to one or more embodiments.

FIG. 1 provides a block diagram illustrating an example of an artificial intelligence (AI) framework integration system 100 according to one or more embodiments, with reference to components and features described herein including but not limited to the figures and associated description. As shown in FIG. 1, the system 100 includes an operator capability manager 110, a graph partitioner 120, a default runtime 130, a framework importer 140, a backend manager 150, a first backend (backend1) 160, a second backend (backend2) 162, hardware execution units including a central processing unit (CPU) 164, a graphics processing unit (GPU) 166, and a hardware accelerator such as a vision processing unit (VPU) 168 (or another type of hardware AI accelerator), an inference engine 170 and an AI coordinator 180. It is understood that a variety of hardware execution units including a plurality of CPUs 164, GPUs 166 and/or VPUs 168 can be employed in the system 100. It is further understood that a variety of backends can be included in the system 100. Together, the backend manager 150, the first backend (backend1) 160, the second backend (backend2) 162, the hardware execution units (including one or more CPUs 164, one or more GPUs 166, and one or more VPUs 168) and the inference engine 170 form an optimized runtime 175.

The system 100 receives as input a pre-trained model 190. The pre-trained model 190 can be developed using an AI framework from a variety of sources, including, for example, TensorFlow, ONNX Runtime, PyTorch, etc. The pre-trained model 190 typically includes information and data regarding the model architecture (i.e., graph), including nodes, operators, weights and biases. Each node in a model graph represents an operation (e.g. mathematical, logical operator etc.) which is evaluated at runtime.

The operator capability manager 110 receives the input pre-trained model 190 and analyzes the operators in the model to determine which operators or nodes are supported, and under what conditions, by the available backend technology and hardware units. The analysis includes evaluating the operators, attributes, data types, and input nodes. The operator capability manager 110 marks the operators or nodes as supported or unsupported.

The graph partitioner 120 takes the pretrained model architecture, as marked by the operator capability manager 110, and partitions (e.g., divides) the model into subgraphs (i.e., groups of operators, or clusters). The subgraphs are allocated into two groups—supported subgraphs and unsupported subgraphs. Supported subgraphs are those subgraphs having operators or nodes that are supported by the available backend technology and hardware units under the conditions present in the model. Unsupported subgraphs are those subgraphs having operators or nodes that are not supported by the available backend technology and hardware units under the conditions present in the model. Supported subgraphs are designated for further processing to be run via the optimized runtime 175. Unsupported subgraphs are designated to be run via the default runtime 130. In some circumstances, the system can be "tuned" to enhance speed and efficiency in execution speed and/or memory usage by re-designating certain supported subgraphs to be executed via the default runtime.

The default runtime 130 is the basic runtime package provided for the AI framework corresponding to the input pre-trained model 190. The default runtime 130 executes on basic CPU hardware with no hardware accelerator support. The default runtime 130 typically includes a compiler to compile the unsupported subgraphs into executable code to be run on the basic CPU hardware.

The framework importer 140 receives supported subgraphs from the graph partitioner 120. The subgraphs are typically in a format specific to the framework used to generate the model. The framework importer 140 takes the subgraphs and generates an intermediate representation for these subgraphs, to be interpreted (i.e., read/parsed) by the optimized runtime 175. The intermediate representation produces a structured data set comprising the model architecture, metadata, weights and biases.

The backend manager 150 receives the intermediate representation of the supported model subgraphs and applies optimization techniques to optimize execution of the model using available backends and hardware options. For example, the backend manager 150 can select among available backends, e.g., the backend1 160 or the backend2 162. In some embodiments, the backend1 160 represents a basic backend that is optimized for a particular group of hardware units. For example, where the optimized runtime 175 utilizes the Open Visual Inference and Neural network Optimization (OpenVINO) runtime technology, the backend1 160 can be the OpenVINO backend. In some embodiments, the backend2 162 can be a backend such as VAD-M, which is optimized for machine vision tasks using a VPU such as the Intel® Myriad X VPU. The selected backend compiles (via a compiler) supported subgraphs into executable code, and performs optimization. The backend manager also selects among the available hardware units—the CPU 164, GPU 166 and/or VPU (or AI accelerator) 168. The backend manager 150 also dispatches data to the selected backend and schedules execution (inference) of the optimized model via the inference engine 170.

The inference engine 170 controls execution of the model code on the various hardware units that are employed for the particular model optimization. The inference engine 170 reads the input data and compiled graphs, instantiates inference on the selected hardware, and returns the output of the inference.

The AI coordinator 180 coordinates execution of AI workflow requests from a user application 195. The AI workflow requests are handled between the default runtime 130 (executing code generated from unsupported subgraphs) and the optimized runtime 175 (e.g., executing code generated from supported subgraphs). In one or more embodiments, the AI coordinator 180 is integrated within the default runtime 130. In one or more embodiments, the AI coordinator 180 is integrated within the optimized runtime 175.

Some or all components in the system 100 may be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the system 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

For example, computer program code to carry out operations by the system 100 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Graph Partitioning to Exploit Batch-Level Parallelism

Figure 2:
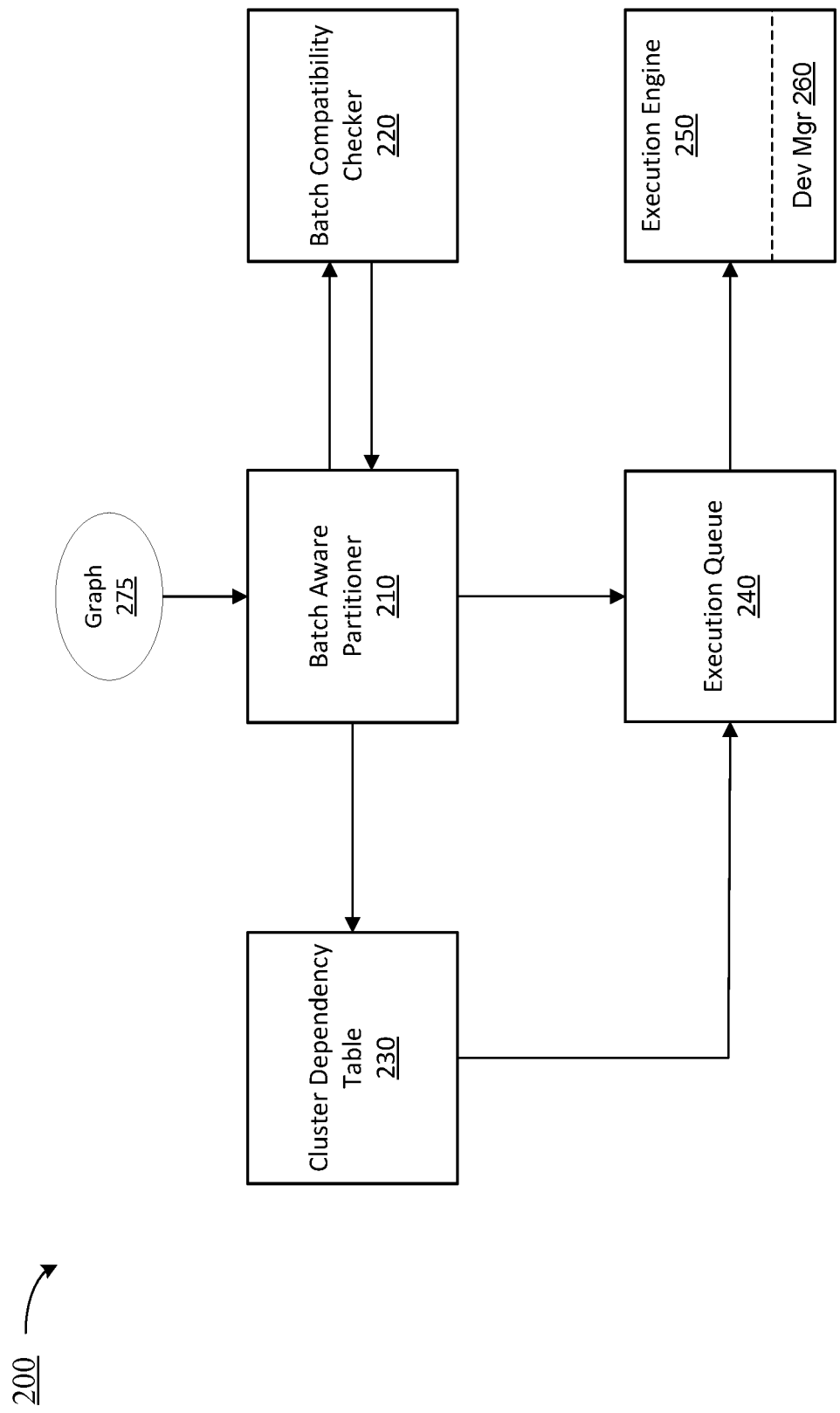
FIG. 2 provides a block diagram illustrating an example system for batch-level parallelism according to one or more embodiments.

The performance-enhanced technology described herein provides an automated mechanism to partition a graph into clusters that support batching and clusters that do not support batching (i.e., fail to support batching), and to distribute batched clusters for execution into multiple hardware units to exploit parallelism. Turning now to FIG. 2, a block diagram is provided illustrating an example of a system 200 for batch-level parallelism according to one or more embodiments, with reference to components and features described herein including but not limited to the figures and associated description. In embodiments, the system 200 can generally be implemented within the system 100 (FIG. 1, already discussed). More particularly, the system 200 can be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out functions described with reference to the system 200 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

As shown in FIG. 2, the system 200 includes a batch aware partitioner 210, a batch compatibility checker 220, a cluster dependency table 230, an execution queue 240, an execution engine 250, and a device manager 260. The system 200 operates to partition an input graph 275. In embodiments, the input graph 275 corresponds to the input pre-trained model 190 (FIG. 1, already discussed). In some embodiments, the input graph 275 corresponds to one or more supported subgraphs generated by the graph partitioner 120 (FIG. 1, already discussed).

The batch aware partitioner 210 receives and traverses the input graph 275 to partition the input graph 275 into a series of clusters. The clusters include batched clusters and non-batched clusters. Each batched cluster includes nodes that support batched data, while each non-batched cluster includes nodes that do not support batched data (i.e., nodes that fail to support batched data). Using the batch compatibility checker 220, the batch aware partitioner 210 determines, for each node of the input graph 275, whether the node does, or does not, support batched data. Based on a batch aware partitioning algorithm, the batch aware partitioner 210 generates batched clusters (clusters of nodes supporting batched data) and non-batched clusters (clusters of nodes that do not support batched data). Clusters are identified by a unique cluster identifier (ID). Each batched cluster is marked (e.g., flagged) as batched and each non-batched cluster is marked (e.g., flagged) as non-batched by the batch aware partitioner 210. Once partitioned, each batched cluster will support batched data, and each non-batched cluster is one that will not support batched data. Further details regarding an example graph partitioning algorithm carried out by the batch aware partitioner 210 are provided with reference to FIGS. 3A-3B herein.

In some example scenarios, additional processing may be required to address various complexities. For example, remapping data layouts can be required to address changes in data layout. To execute a batched cluster, the input data should be in batch first order in memory so that each data batch can be fed to a separate request. In examples, an operator (e.g. Transpose) can change the layout of the input. In such a case, the batch dimension in the output may not be the first dimension anymore. Since the system can track the batch dimension during the clustering phase, the system can identify if the output or input of a cluster has this kind of layout and can remap the data in memory correspondingly.

As another example, splitting of branches into non-batched clusters may be required. In some scenarios, a node output (batched) can be divided into multiple branches where each batch of data follows a separate branch. In such a case, if those branches merge back later and still preserve the support for batched data, all branches can be the part of the original batched cluster. Otherwise, the batched cluster should not include those branches and each branch should be a part of non-batched cluster. In some embodiments, an example process for handling such cases can include the following:

(1) If a batched cluster divides into multiple branches where each batch is the input of a branch, a child cluster is created for each branch where the initial branch is the parent branch.

(2) The clustering algorithm is run over each child cluster, but they are not marked as batched or non-batched yet.

(3) If any of these child clusters merge with the other ones, the merging points (nodes) should be marked.

(4) If these branches merge back later in the graph, they should end up in a single cluster. If this is the case, a search will be done again starting from each merging point. This is a partial search to mark the cluster as batched or non-batched. Nodes are traversed similar to the clustering algorithm but no clusters will be formed. The search will start from each merging point to the cluster's output nodes.

(5) If the child cluster is marked as batched, it will be merged with the parent cluster. If the child cluster is marked as non-batched, then the child cluster will split from the parent cluster and form a separate cluster.

(6) If multiple child clusters remain after they are formed, then each child cluster will be split from the parent cluster and form a separate cluster, to be marked as non-batched.

The batch compatibility checker 220 provides a way to determine if a node supports batched data, by checking the operator for the respective node. The batch compatibility checker 220 maintains a batch support table, which includes an entry for each operator type. In embodiments, the batch support table is indexed with an operator type identifier (ID) and a pointer to a compatibility checking function for the corresponding operator. The compatibility checking function is unique for each operator, and is configured to receive attributes of the operator and to return a value that flags if the operator supports batched data. The compatibility checking function is configured to return the batch dimension of the output if the operator supports batched data.

The cluster dependency table (CDT) 230 stores information regarding dependencies between clusters. Some clusters will have an input that is dependent upon the output of other cluster, and these dependencies can be determined during the process of partitioning the graph into clusters. For each cluster dependency determined during the partitioning process, the dependency is stored in the cluster dependency table 230 indexed by cluster IDs. In some embodiments, the cluster dependency table 230 is a two-dimensional (2D) table where each dimension size is equal to the number of clusters generated. Cluster IDs can be assigned in consecutive order starting from 0 to enhance indexing. For example, the ID for Cluster 1 can be 0, the ID for Cluster 2 can be 1, etc. Thus, in an example, if Cluster 2 has a dependency on Cluster 1, the table entry CDT[cluster2][cluster1] is set to 1, where "cluster1" is the ID of Cluster 1 and "cluster2" is the ID of Cluster 2. Otherwise, the table entry CDT[cluster2][cluster1] is set to 0. An example illustrating cluster generation with clusters having dependencies is provided in FIG. 4 herein.

The execution queue 240 builds a list of clusters to be scheduled for execution. Using the cluster dependency table 230, the clusters generated by the partitioning process are grouped based on the execution order and inserted into the execution queue 240. Those clusters which do not have any dependency (e.g., according to CDT 230) and can be executed in parallel are formed into the same group. Clusters which are in the same group can be executed simultaneously, and clusters belonging to different groups are set to be executed in order based on the cluster dependencies. Thus, in an example, the execution engine 250 can first execute the cluster(s) from a first group. If the first group contains multiple clusters, they can be executed in parallel; after completing the execution of the first group, the execution engine 250 can execute the cluster(s) from the second group, and so on. Each entry of the execution queue 240 includes the cluster ID and a group identifier (ID). Examples illustrating an execution queue are provided in FIGS. 5A-5B herein.

Figure 6:
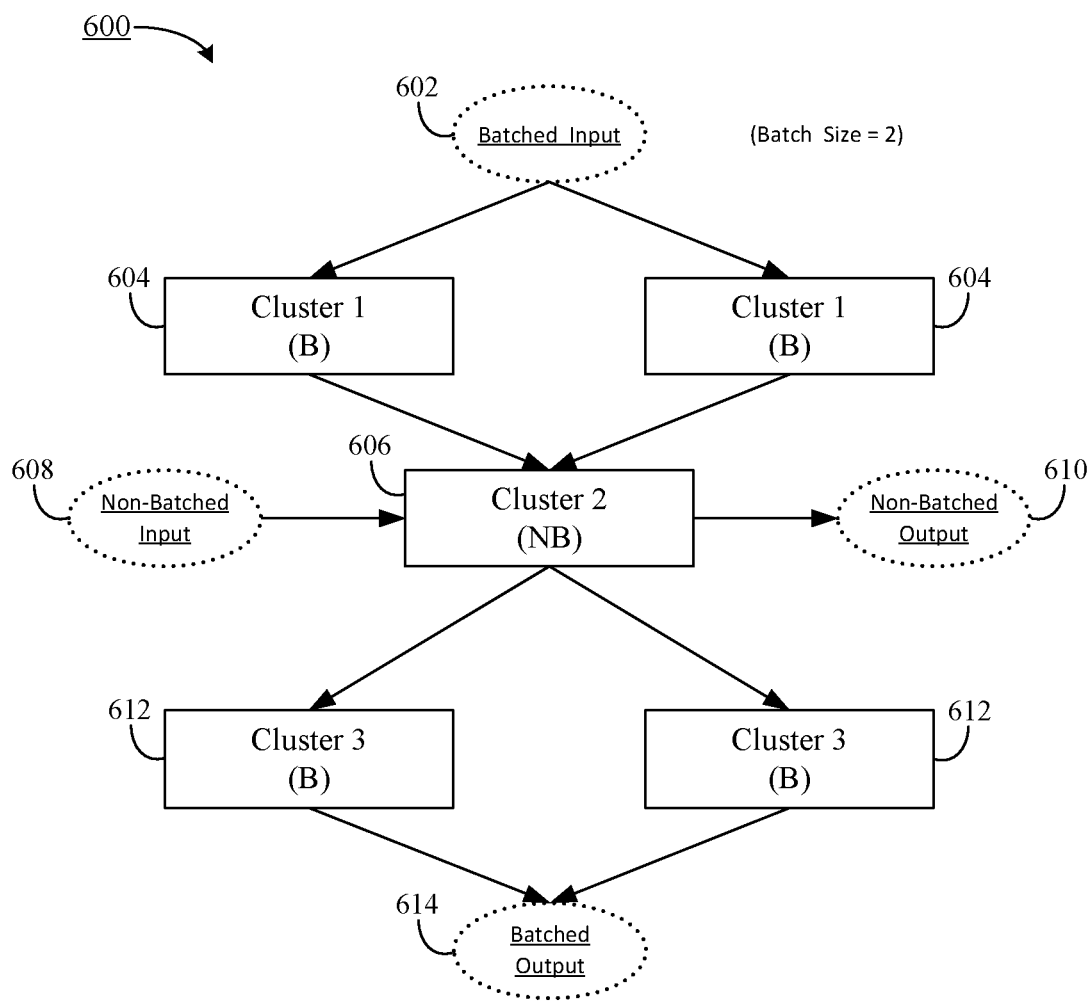
FIG. 6 provides a diagram illustrating an example execution flow for exploiting batch-level parallelism according to one or more embodiments.

The execution engine 250 is responsible for scheduling inference executions of the clusters. The execution engine 250 interfaces with the execution queue 240 and pops the clusters from the queue, if the cluster inputs are ready, and creates execution requests to run the clusters on the hardware units. For each non-batched cluster, only one request is created to run inference. For each batched cluster, multiple requests can be created to run inference. The number of requests per cluster can be equal to or lower than the batch size, based on the system configurations. The number of requests can be determined, e.g., by the number of available devices, the capability of these devices, and other configurations provided by the user. For example, if the number of available devices is less than the batch size, one request is assigned per device. In an example, if the batch size is 4 and we have two available discrete GPUs, two requests are created (one request for each GPU) where each request will execute the inference with batch size equal to 2. In another example, with an available device such as the Intel® VAD-M with eight MYRIAD devices, up to eight parallel requests can be created. If the batch size is 8, eight requests are created (one for each MYRIAD device). If the batch size is larger than 8, the number of requests will still be eight but the batch size for each request will increase. Further, this can be configured by the user for further performance tuning. For example, the system can be configured to generate one request per batch regardless of the number of available devices. Thus, in such a case if there are two discrete GPUs available, and the system is configured to create one request for each batch, then for a batch size of 4, four requests will be created, and two requests (with batch size of 1 each) will assigned to each GPU. Depending on cluster execution order as set in the execution queue 240, different clusters can be executed simultaneously or consecutively based on data dependencies and hardware resource availability. An example of an execution flow is illustrated in FIG. 6 herein.

The device manager 260 manages inference execution on different types of devices that are available in the system 200. The system 200 can include multiple device types for execution, such as a central processing unit (CPU), a graphics processing unit (GPU), a field programmable gate array (FPGA) accelerator, etc., and the system 200 can include multiple hardware units for any of the device types. The device manager 260 also provides information about execution resources for each device, to decide the number of requests to assign on a particular device. As illustrated in FIG. 2, the device manager 260 is a component integrated within the execution engine 250. In some embodiments, the device manager 260 is separate from the execution engine 250.

Figure 3A:
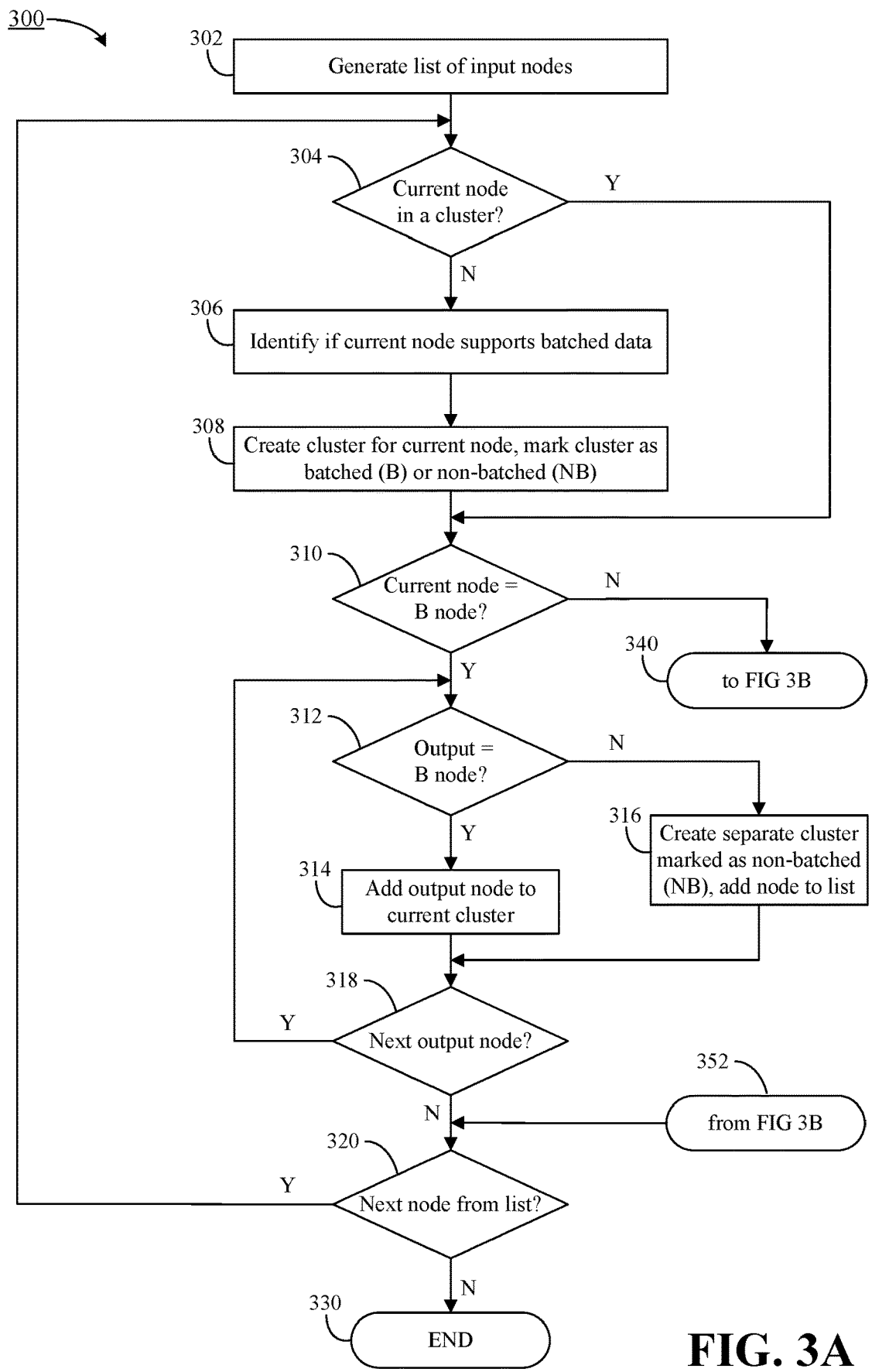
FIGS. 3A-3B provide flow diagrams illustrating an example method of graph partitioning for batch-level parallelism according to one or more embodiments.
Figure 3B:
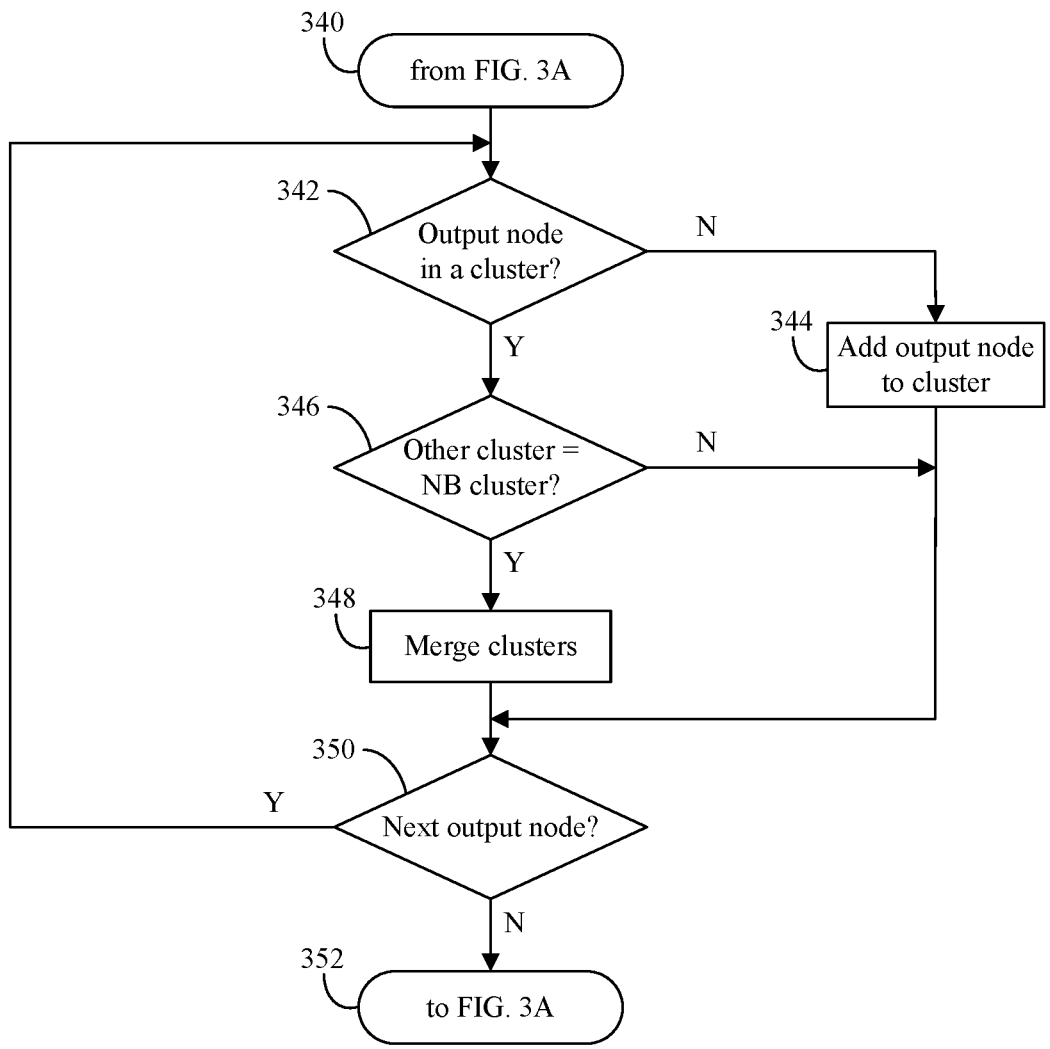

FIGS. 3A-3B provide flow diagrams illustrating an example method 300 of graph partitioning for batch-level parallelism according to one or more embodiments, with reference to components and features described herein including but not limited to the figures and associated description. The method 300 can generally be implemented in the system 100 (FIG. 1, already discussed) or in the system 200 (FIG. 2, already discussed), and can correspond to at least portions of logic in the batch aware partitioner 210. More particularly, the method 300 can be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Turning to FIG. 3A, the process begins at illustrated processing block 302 by generating a work list of input nodes for the input graph (or subgraph). The input graph corresponds to input graph 275 (FIG. 2, already discussed). Processing beginning with block 304 is performed for every node on the work list. At illustrated processing block 304, a node (the current node) is obtained from the work list and checked to determine if the node is in a cluster. The first time through the process, this will typically be the first node on the list. If the current node is already part of a cluster (Yes at block 304), the process proceeds with block 310. If the current node is not already part of a cluster (No at block 304), the process continues at block 306 where the current node is checked to see if it supports batched data. In embodiments, this check is performed by the batch compatibility checker 220 (FIG. 2, already discussed). In some embodiments, the node is marked as batched (B) or non-batched (NB) depending on the result from the batch compatibility check. Illustrated processing block 308 provides for creating a cluster for the current node, where the cluster is marked as batched (B) or non-batched (NB) depending on the batch compatibility check for the node.

At illustrated processing block 310, if the current node is a non-batched node (No at block 310), the process proceeds to block 340 (FIG. 3B, discussed below). If the current node is a batched node (Yes at block 310), the process continues with block 312. Processing beginning with block 312 through block 318 is performed for every output node of the current node (which is a batched node). Output nodes are nodes receiving an output from the current node (e.g., nodes that are connected to output edges of the current node).

At illustrated processing block 312, the output node is checked to see if it supports batched data (i.e., does the node support batched input data and produce batched output data without creating a dependency between batches). If the output node supports batched data (Yes at block 312), the output node is added to the current cluster (i.e., the cluster with the current node) at block 314. The process then continues with block 318. If the output node does not support batched data (No at block 312), the process proceeds to block 316, where a separate cluster is created for the output node and marked as non-batched (NB), and the output node is added to the work list. The process then continues with block 318. At block 318, if there are any further output nodes for the current node (Yes at block 318), the process returns to block 312 to evaluate the next output node. If there are no further output nodes (No at block 318), the process continues with block 320.

For a non-batched current node (FIG. 3B) processing returns at block 352 and proceeds with block 320.

As mentioned above, the processing beginning at block 304 is performed for every node on the work list. Accordingly, at illustrated processing block 320, a check is made to determine if there are any more nodes on the work list to evaluate using the partitioning process. If there are more nodes on the work list (Yes at block 340), the process returns to block 304. If there are no further nodes on the list to evaluate (No at block 320), the process continues to block 330.

At illustrated processing block 330, the partitioning process is complete. There are no further nodes in the work list to traverse, and all clusters are generated.

Turning now to FIG. 3B, the process picks up at block 340 from FIG. 3A (where the current node has been identified as non-batched). Processing beginning with block 342 through block 350 is performed for every output node of the current node. Output nodes are nodes receiving an output from the current node (e.g., nodes that are connected to output edges of the current node). At illustrated processing block 342, the output node is checked to determine if it is in a cluster. If not (No at block 342), the output node is added to the current cluster at block 344 and the process proceeds to block 350. If the output node is already part of another cluster (Yes at block 342) the other cluster is checked to see if it is a non-batched cluster at block 346. If the other cluster is a batched cluster (No at block 346) the process proceeds to block 350. If the other cluster is a non-batched cluster (Yes at block 346), the other cluster with the output node is merged with the current cluster at block 348. The process then continues with block 350.

At block 350, if there are any further output nodes for the current node (Yes at block 350), the process returns to block 342 to evaluate the next output node. If there are no further output nodes (No at block 350), the process continues with block 352 (FIG. 3A).

Figure 4:
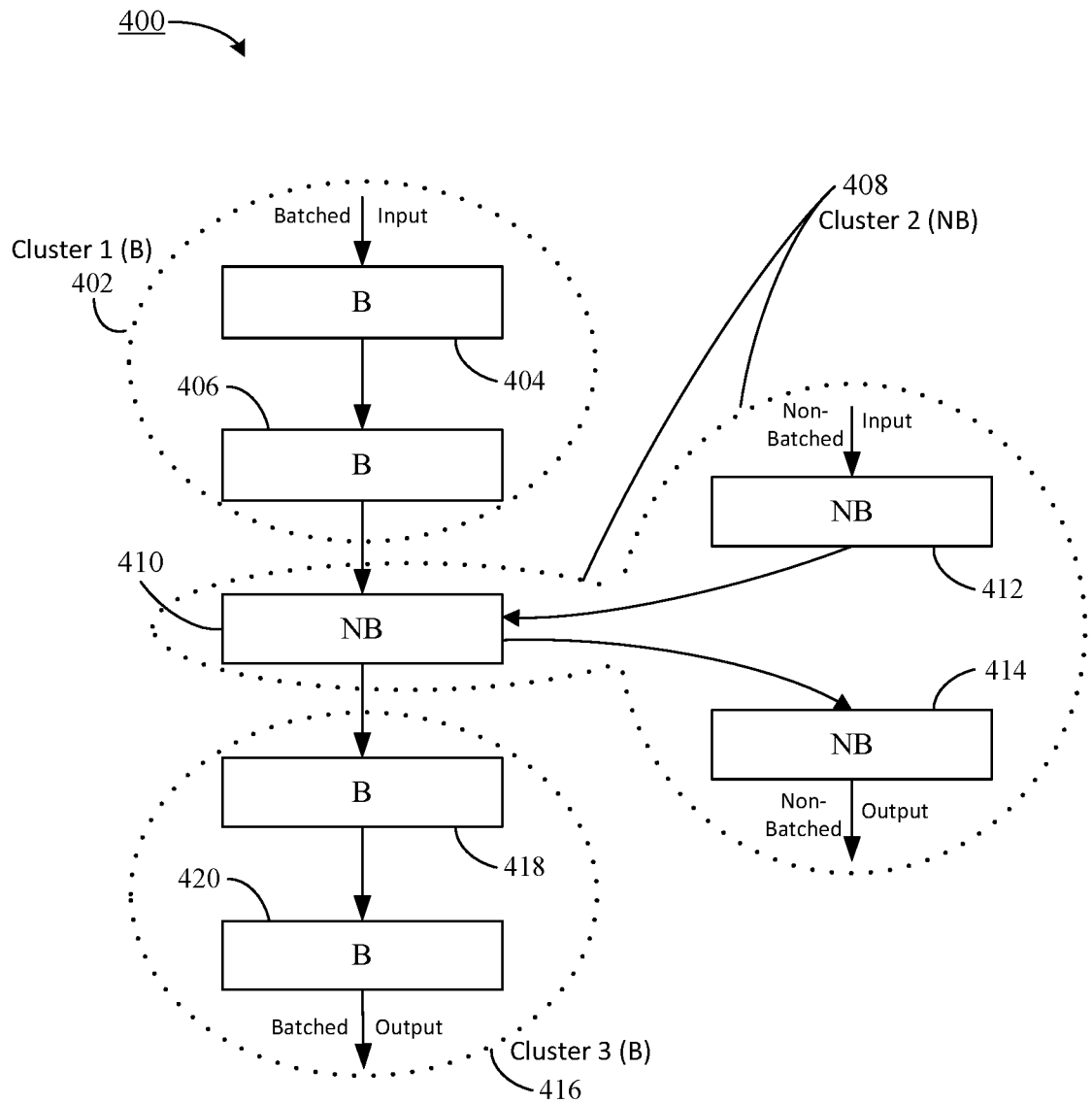
FIG. 4 provides a diagram illustrating an example of partitioning a graph into clusters according to one or more embodiments.

FIG. 4 provides a diagram illustrating an example 400 of partitioning a graph into clusters according to one or more embodiments, with reference to components and features described herein including but not limited to the figures and associated description. The example 400 illustrates the results of partitioning for a simplified graph. The partitioning example 400 can result from operation of the batch aware partitioner 210 (FIG. 2, already discussed).

In the example 400, three clusters are generated from the graph. A first cluster 402 (Cluster 1) includes two nodes—a batched node (B) 404 and a batched node (B) 406. The cluster 402 operates on batched input data as input to B node 404, where the output of B node 404 feeds into B node 406 (that is, B node 406 is an output node of B node 404). The first cluster 402 (Cluster 1) is marked as batched (B).

A second cluster 408 (Cluster 2) includes three nodes—a non-batched node (NB) 410, a non-batched node (NB) 412 and a non-batched node (NB) 414. The NB node 410 receives input from the output of B node 406 (that is, NB node 410 is an output node of B node 406) and, thus, the second cluster 408 is dependent on the first cluster 402. The NB node 410 also receives input from NB node 412, which in turn receives non-batched input data. Non-batched output of NB node 410 feeds into NB node 414, which in turn provides non-batched output. The second cluster 402 (Cluster 2) is marked as non-batched (NB), because the cluster does not support batched data (i.e., the cluster fails to support batched data).

A third cluster 416 (Cluster 3) includes two nodes—a batched node (B) 418 and a batched node (B) 420. The B node 418 receives data from NB node 410 (that is, B node 418 is an output node of NB node 410) and, thus, the third cluster 416 is dependent on the second cluster 408. The output of B node 418 feeds into B node 420, which in turn provides batched output data. The third cluster 416 (Cluster 3) is marked as batched (B).

Figure 5A:
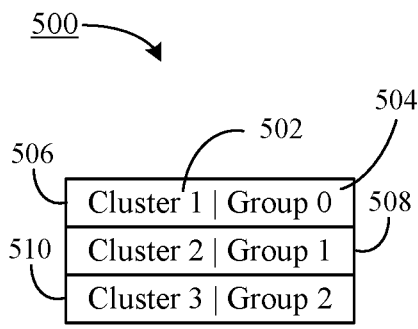
FIGS. 5A-5B provide diagrams illustrating examples of an execution queue according to one or more embodiments.
Figure 5B:
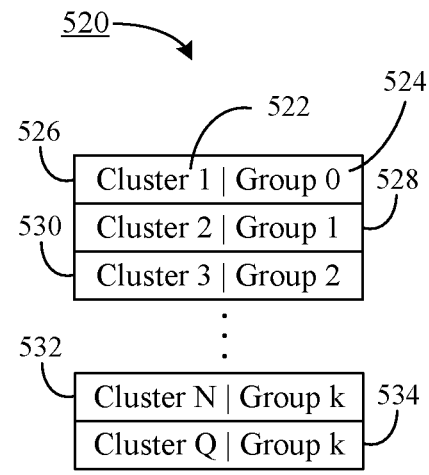

FIGS. 5A-5B provide diagrams illustrating examples 500 and 520 of an execution queue according to one or more embodiments, with reference to components and features described herein including but not limited to the figures and associated description. Each of the example execution queue 500 and the example execution queue 520 can result from operation of the execution queue 240 in conjunction with the patch aware partitioner 210 and the cluster dependency table 230 (FIG. 2, already discussed).

In particular, the example execution queue 500 illustrates an execution queue that can result from the graph partitioning example 400 (FIG. 4, already discussed). As shown in FIG. 5A, the execution queue 500 includes entries for a cluster ID 502 and a group ID 504. The execution queue 500 includes entries for three clusters: Cluster 1 with group ID Group 0 (label 506), Cluster 2 with group ID Group 1 (label 508), and Cluster 3 with group ID Group 2 (label 510). Because Cluster 2 has dependency on Cluster 1 (as shown in the partitioning example 400), they are each assigned to unique groups. Also, because Cluster 3 has dependency on Cluster 2 (as shown in the partitioning example 400), Cluster 3 is similarly assigned to a unique group. The execution queue may include additional information about the clusters, such as, e.g., batched (B) or non-batched (NB) status, etc. In the example execution queue 500, the cluster entries are listed in execution order (which can be determined based on cluster dependencies).

As shown in FIG. 5B, a second example execution queue 520 includes entries for a cluster ID 522 and a group ID 524. The execution queue 500 includes entries for a number of clusters: Cluster 1 with group ID Group 0 (label 526), Cluster 2 with group ID Group 1 (label 528), Cluster 3 with group ID Group 2 (label 530), as well as Cluster N with group ID Group k (label 532) and Cluster Q with group ID Group k (label 534). Similar to the example in FIG. 5A, the example execution queue 520 shows that Cluster 1, Cluster 2, and Cluster 3 are assigned to unique groups. The example execution queue 520 further shows that Cluster N and Cluster Q are both assigned to the same group (Group k) and, thus, can be executed simultaneously.

FIG. 6 provides a diagram illustrating an example execution flow 600 for exploiting batch-level parallelism according to one or more embodiments, with reference to components and features described herein including but not limited to the figures and associated description. The example execution flow 600 can result from operation of the execution engine 250 (FIG. 2, already discussed). In particular, the example execution flow 600 illustrates an execution flow based on the graph partitioning example 400 (FIG. 4, already discussed) and the example execution queue 500 (FIG. 5A, already discussed). The first cluster in the execution queue 500 is Cluster 1. Since Cluster 1 is marked as batched (B), the input data 602 can be split into multiple batches and a separate inference request can be assigned to execute each batch in parallel. As shown in FIG. 6, the batch size is 2, thus the input data 602 is split into two batches for execution in parallel. Two inference requests 604 for Cluster 1 are assigned for parallel execution on the two batches of input data 602.

According to the execution queue 500, Cluster 2 is to execute after Cluster 1 and before Cluster 3. Because Cluster 2 is marked as non-batched (NB), only a single inference request 606 for Cluster 2 is assigned. The output from the two inferences of Cluster 1 is to be combined (i.e., merged) and fed into Cluster 2. Based on the arrangement of nodes assigned to Cluster 2 (see FIG. 4, already discussed) a non-batched input 608 is also fed into Cluster 2, and non-batched output 610 results. Output from Cluster 2 feeds into Cluster 3.

Since Cluster 3 is marked as batched (B), the data to be fed into Cluster 3 from Cluster 2 can be split into two batches (for batch size of 2) and a separate inference request can be assigned to execute each batch in parallel. Two inference requests 612 for Cluster 3 are assigned for parallel execution on the two batches of data. Batched output 614 is to result from execution via Cluster 3. While a batch size of 2 is illustrated in the example execution flow 600, other batch sizes are possible. Additionally, different batch sizes can be used for each cluster. For example, the input of a first cluster can have a batch size of 2, whereas a second cluster can produce an output with batch size of 4, which is the input for a third cluster. In turn, the third cluster can be assigned for parallel execution on four batches.

Figure 7A:
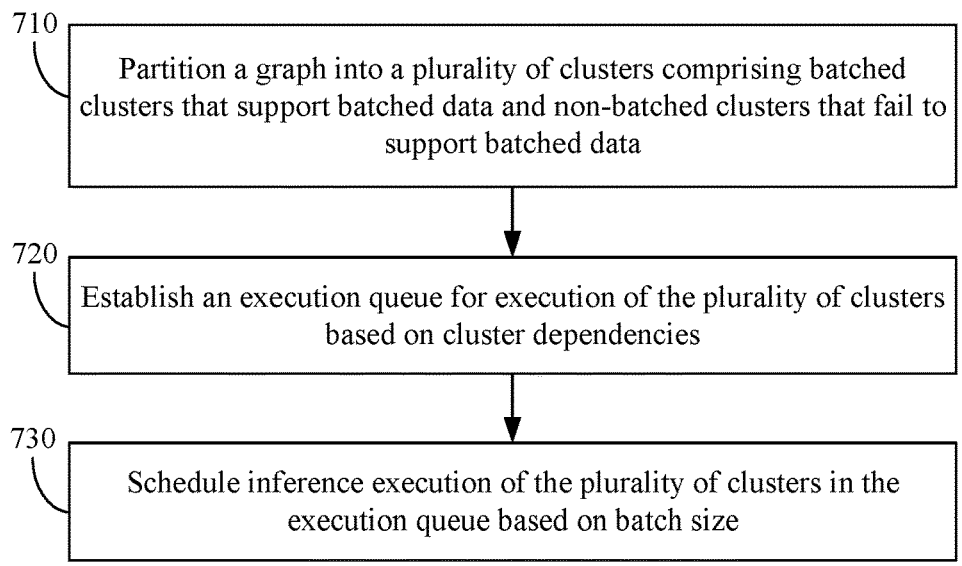
FIG. 7A provides a flow chart illustrating an example method of operating a system for batch-level parallelism according to one or more embodiments.

FIG. 7A provides a flow chart illustrating an example method 700 of operating a system for batch-level parallelism according to one or more embodiments, with reference to components and features described herein including but not limited to the figures and associated description. The method 700 can generally be implemented in the system 100 (FIG. 1, already discussed) and/or in the system 200 (FIG. 2, already discussed). More particularly, the method 700 can be implemented as one or more modules in a set of logic instructions stored in a non-transitory machine- or computer-readable storage medium such as RAM, ROM, programmable ROM (PROM), firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 710 provides for partitioning a graph into a plurality of clusters comprising batched clusters that support batched data and non-batched clusters that fail to support batched data. Illustrated processing block 720 provides for establishing an execution queue for execution of the plurality of clusters based on cluster dependencies. Illustrated processing block 730 provides for scheduling inference execution of the plurality of clusters in the execution queue based on batch size.

Figure 7B:
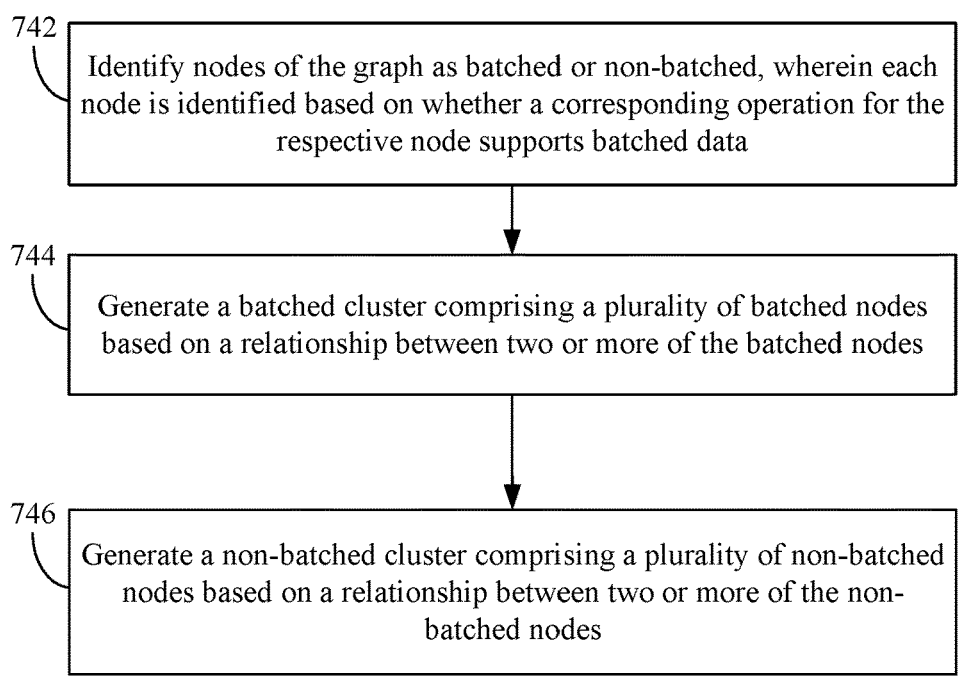
FIG. 7B provides a flow chart illustrating an example method for partitioning a graph into clusters according to one or more embodiments.

FIG. 7B provides a flow chart illustrating an example method 740 for partitioning a graph into clusters according to one or more embodiments, with reference to components and features described herein including but not limited to the figures and associated description. The method 740 can generally be implemented in the system 100 (FIG. 1, already discussed) and/or in the system 200 (FIG. 2, already discussed). All or portions of the method 740 can be substituted for all or a portion of illustrated processing block 710 (FIG. 7A, already discussed). More particularly, the method 740 can be implemented as one or more modules in a set of logic instructions stored in a non-transitory machine- or computer-readable storage medium such as RAM, ROM, programmable ROM (PROM), firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 742 provides for identifying nodes of the graph as batched or non-batched, wherein each node is identified based on whether a corresponding operation for the respective node supports batched data. Illustrated processing block 744 provides for generating a batched cluster comprising a plurality of batched nodes based on a relationship between two or more of the batched nodes. In embodiments, the partitioning process can generate a plurality of batched clusters. Illustrated processing block 746 provides for generating a non-batched cluster comprising a plurality of non-batched nodes based on a relationship between two or more of the non-batched nodes. In embodiments, the partitioning process can generate a plurality of non-batched clusters.

Figure 8:
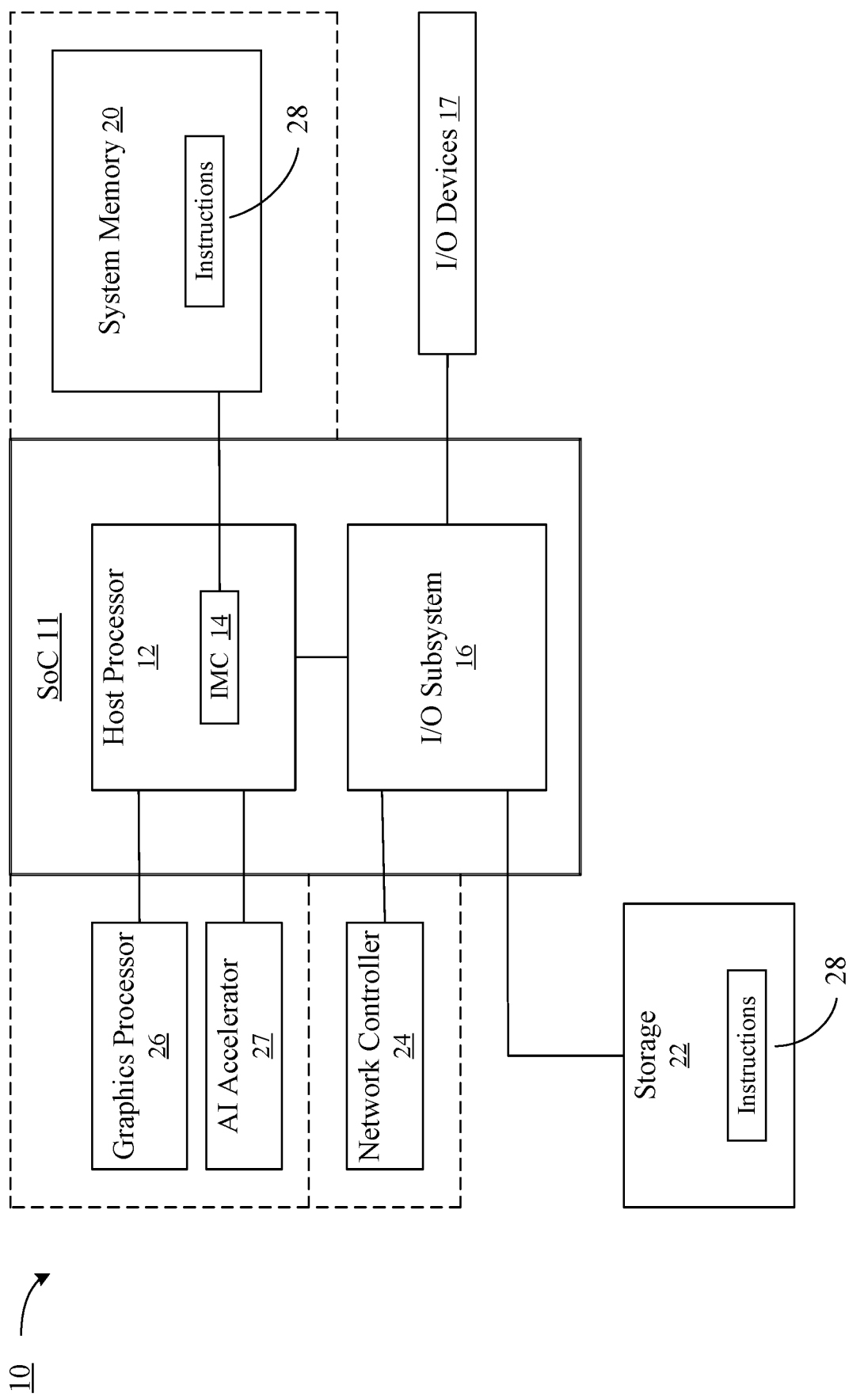
FIG. 8 is a block diagram illustrating an example computing system for AI framework integration according to one or more embodiments.

FIG. 8 shows a block diagram illustrating an example computing system 10 for batch-level parallelism according to one or more embodiments, with reference to components and features described herein including but not limited to the figures and associated description. The system 10 can generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 can include a host processor 12 (e.g., central processing unit/CPU) having an integrated memory controller (IMC) 14 that can be coupled to system memory 20. The host processor 12 can include any type of processing device, such as, e.g., microcontroller, microprocessor, RISC processor, ASIC, etc., along with associated processing modules or circuitry. The system memory 20 can include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 can also include an input/output (I/O) subsystem 16. The I/O subsystem 16 can communicate with for example, one or more input/output (I/O) devices 17, a network controller 24 (e.g., wired and/or wireless NIC), and storage 22. The storage 22 can be comprised of any appropriate non-transitory machine- or computer-readable memory type (e.g., flash memory, DRAM, SRAM (static random access memory), solid state drive (SSD), hard disk drive (HDD), optical disk, etc.). The storage 22 can include mass storage. In some embodiments, the host processor 12 and/or the I/O subsystem 16 can communicate with the storage 22 (all or portions thereof) via a network controller 24. In some embodiments, the system 10 can also include a graphics processor 26 (e.g., a graphics processing unit/GPU) and an AI accelerator 27. In an embodiment, the system 10 can also include a vision processing unit (VPU), not shown.

The host processor 12 and the I/O subsystem 16 can be implemented together on a semiconductor die as a system on chip (SoC) 11, shown encased in a solid line. The SoC 11 can therefore operate as a computing apparatus for batch-level parallelism. In some embodiments, the SoC 11 can also include one or more of the system memory 20, the network controller 24, and/or the graphics processor 26 (shown encased in dotted lines). In some embodiments, the SoC 11 can also include other components of the system 10.

The host processor 12 and/or the I/O subsystem 16 can execute program instructions 28 retrieved from the system memory 20 and/or the storage 22 to perform one or more aspects of process 300, process 700, and/or process 740. The system 10 can implement one or more aspects of system 100 and/or system 200 as described herein with reference to FIGS. 1 and 2. The system 10 is therefore considered to be performance-enhanced at least to the extent that technology provides the ability to autonomously partition any graph to exploit data and model parallelism on multiple hardware units.

Computer program code to carry out the processes described above can be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 can include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

I/O devices 17 can include one or more of input devices, such as a touch-screen, keyboard, mouse, cursor-control device, touch-screen, microphone, digital camera, video recorder, camcorder, biometric scanners and/or sensors; input devices can be used to enter information and interact with system 10 and/or with other devices. The I/O devices 17 can also include one or more of output devices, such as a display (e.g., touch screen, liquid crystal display/LCD, light emitting diode/LED display, plasma panels, etc.), speakers and/or other visual or audio output devices. The input and/or output devices can be used, e.g., to provide a user interface.

Figure 9:
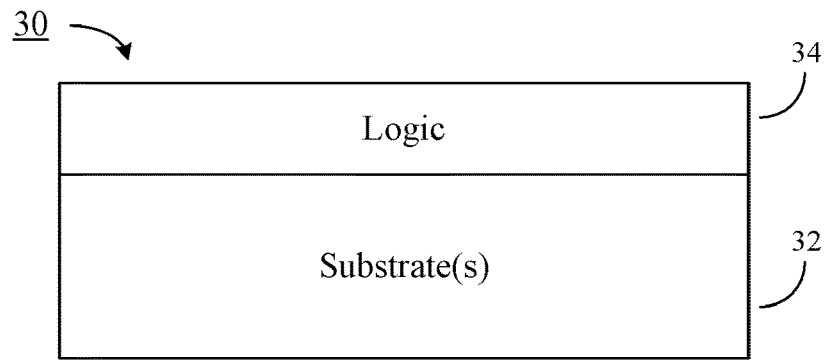
FIG. 9 is a block diagram illustrating an example semiconductor apparatus according to one or more embodiments.

FIG. 9 shows a block diagram illustrating an example semiconductor apparatus 30 for batch-level parallelism according to one or more embodiments, with reference to components and features described herein including but not limited to the figures and associated description. The semiconductor apparatus 30 can be implemented, e.g., as a chip, die, or other semiconductor package. The semiconductor apparatus 30 can include one or more substrates 32 comprised of, e.g., silicon, sapphire, gallium arsenide, etc. The semiconductor apparatus 30 can also include logic 34 comprised of, e.g., transistor array(s) and other integrated circuit (IC) components) coupled to the substrate(s) 32. The logic 34 can be implemented at least partly in configurable logic or fixed-functionality logic hardware. The logic 34 can implement the system on chip (SoC) 11 described above with reference to FIG. 8. The logic 34 can implement one or more aspects of the processes described above, including process 300, process 700, and/or process 740. The logic 34 can implement one or more aspects of system 100 and/or system 200 as described herein with reference to FIGS. 1 and 2. The apparatus 30 is therefore considered to be performance-enhanced at least to the extent that the technology provides the ability to autonomously partition any graph to exploit data and model parallelism on multiple hardware units.

The semiconductor apparatus 30 can be constructed using any appropriate semiconductor manufacturing processes or techniques. For example, the logic 34 can include transistor channel regions that are positioned (e.g., embedded) within the substrate(s) 32. Thus, the interface between the logic 34 and the substrate(s) 32 can not be an abrupt junction. The logic 34 can also be considered to include an epitaxial layer that is grown on an initial wafer of the substrate(s) 34.

Figure 10:
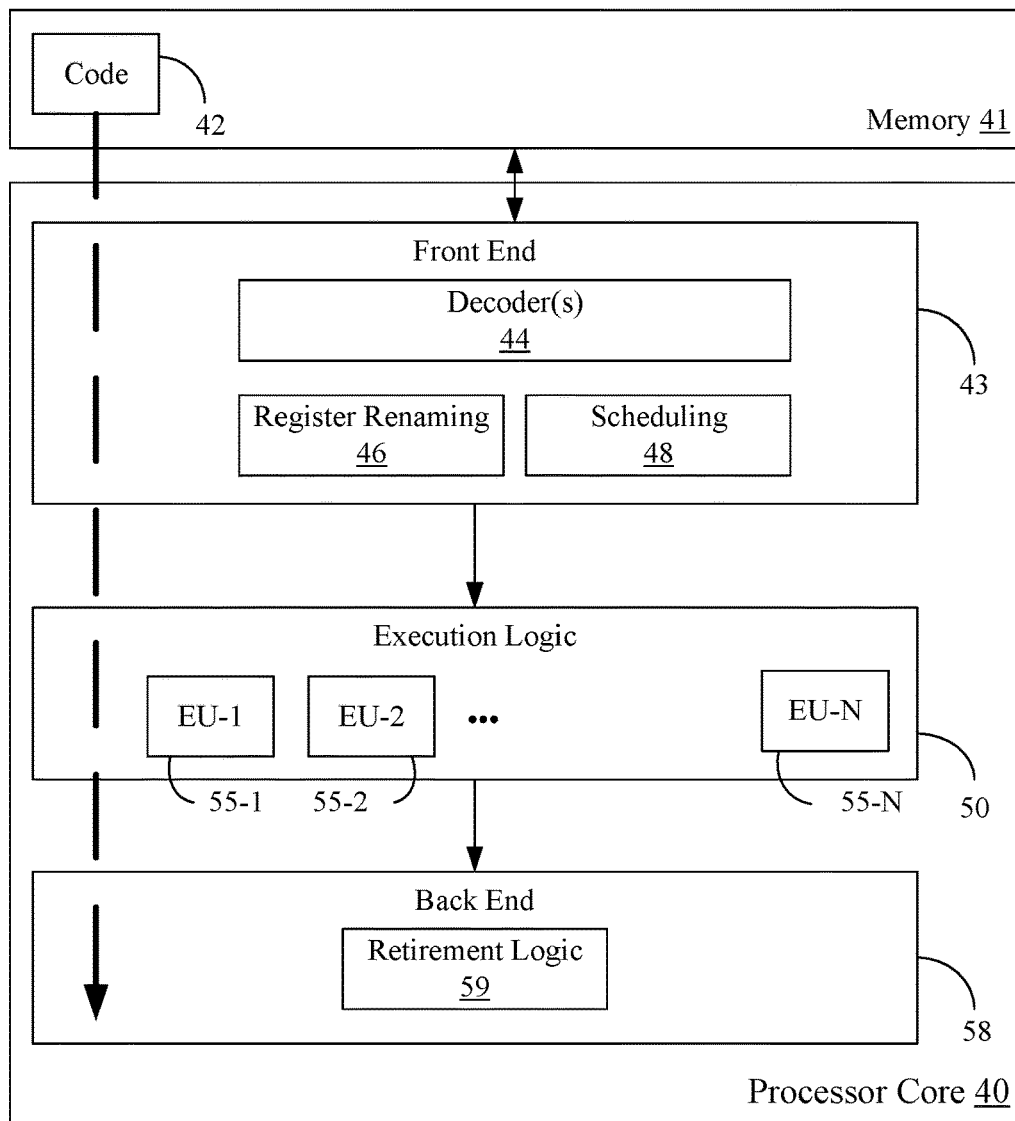
FIG. 10 is a block diagram illustrating an example processor according to one or more embodiments.

FIG. 10 is a block diagram illustrating an example processor core 40 according to one or more embodiments, with reference to components and features described herein including but not limited to the figures and associated description. The processor core 40 can be the core for any type of processor, such as a micro-processor, an embedded processor, a digital signal processor (DSP), a network processor, a graphics processing unit (GPU), or other device to execute code. Although only one processor core 40 is illustrated in FIG. 10, a processing element can alternatively include more than one of the processor core 40 illustrated in FIG. 10. The processor core 40 can be a single-threaded core or, for at least one embodiment, the processor core 40 can be multithreaded in that it can include more than one hardware thread context (or "logical processor") per core.

FIG. 10 also illustrates a memory 41 coupled to the processor core 40. The memory 41 can be any of a wide variety of memories (including various layers of memory hierarchy) as are known or otherwise available to those of skill in the art. The memory 41 can include one or more code 42 instruction(s) to be executed by the processor core 40. The code 42 can implement one or more aspects of the processes 300, 700 and/or 740 described above. The processor core 40 can implement one or more aspects of system 100 and/or system 200 as described herein with reference to FIGS. 1 and 2. The processor core 40 can follow a program sequence of instructions indicated by the code 42. Each instruction can enter a front end portion 43 and be processed by one or more decoders 44. The decoder 44 can generate as its output a micro operation such as a fixed width micro operation in a predefined format, or can generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments can include a number of execution units dedicated to specific functions or sets of functions. Other embodiments can include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 can take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 10, a processing element can include other elements on chip with the processor core 40. For example, a processing element can include memory control logic along with the processor core 40. The processing element can include I/O control logic and/or can include I/O control logic integrated with memory control logic. The processing element can also include one or more caches.

Figure 11:
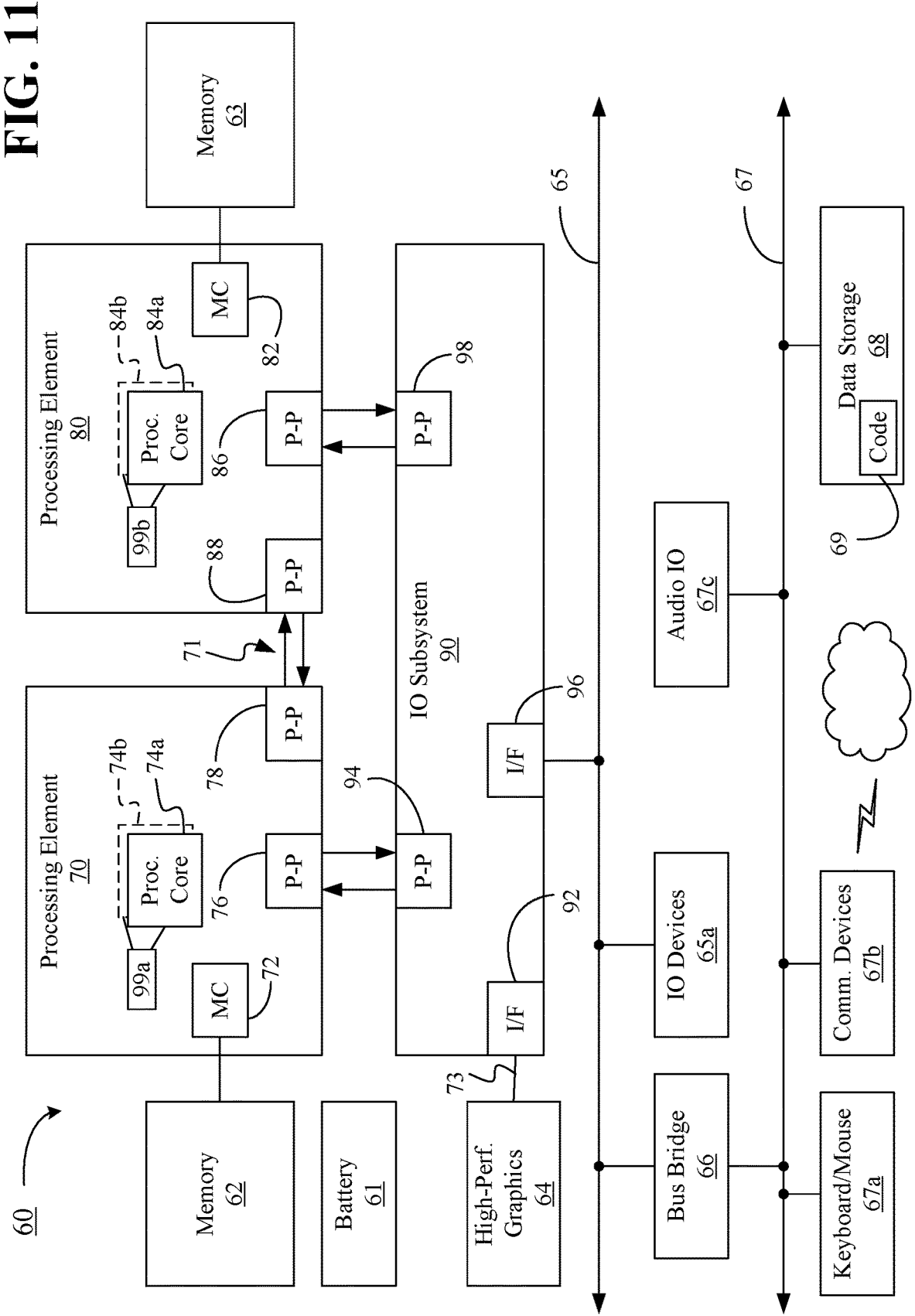
FIG. 11 is a block diagram illustrating an example of a multiprocessor-based computing system according to one or more embodiments.

FIG. 11 is a block diagram illustrating an example of a multi-processor based computing system 60 according to one or more embodiments, with reference to components and features described herein including but not limited to the figures and associated description. The multiprocessor system 60 includes a first processing element 70 and a second processing element 80. While two processing elements 70 and 80 are shown, it is to be understood that an embodiment of the system 60 can also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 11 can be implemented as a multi-drop bus rather than point-to-point interconnect.

As shown in FIG. 11, each of the processing elements 70 and 80 can be multicore processors, including first and second processor cores (i.e., processor cores 74a and 74b and processor cores 84a and 84b). Such cores 74a, 74b, 84a, 84b can be configured to execute instruction code in a manner similar to that discussed above in connection with FIG. 10.

Each processing element 70, 80 can include at least one shared cache 99a, 99b. The shared cache 99a, 99b can store data (e.g., instructions) that are utilized by one or more components of the processor, such as the cores 74a, 74b and 84a, 84b, respectively. For example, the shared cache 99a, 99b can locally cache data stored in a memory 62, 63 for faster access by components of the processor. In one or more embodiments, the shared cache 99a, 99b can include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments is not so limited. In other embodiments, one or more additional processing elements can be present in a given processor. Alternatively, one or more of the processing elements 70, 80 can be an element other than a processor, such as an accelerator or a field programmable gate array. For example, additional processing element(s) can include additional processor(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences can effectively manifest themselves as asymmetry and heterogeneity amongst the processing elements 70, 80. For at least one embodiment, the various processing elements 70, 80 can reside in the same die package.

The first processing element 70 can further include memory controller logic (MC) 72 and point-to-point (P-P) interfaces 76 and 78. Similarly, the second processing element 80 can include a MC 82 and P-P interfaces 86 and 88. As shown in FIG. 11, MC's 72 and 82 couple the processors to respective memories, namely a memory 62 and a memory 63, which can be portions of main memory locally attached to the respective processors. While the MC 72 and 82 is illustrated as integrated into the processing elements 70, 80, for alternative embodiments the MC logic can be discrete logic outside the processing elements 70, 80 rather than integrated therein.

The first processing element 70 and the second processing element 80 can be coupled to an I/O subsystem 90 via P-P interconnects 76 and 86, respectively. As shown in FIG. 11, the I/O subsystem 90 includes P-P interfaces 94 and 98. Furthermore, the I/O subsystem 90 includes an interface 92 to couple I/O subsystem 90 with a high performance graphics engine 64. In one embodiment, a bus 73 can be used to couple the graphics engine 64 to the I/O subsystem 90. Alternately, a point-to-point interconnect can couple these components.

In turn, the I/O subsystem 90 can be coupled to a first bus 65 via an interface 96. In one embodiment, the first bus 65 can be a Peripheral Component Interconnect (PCI) bus, or a bus such as a PCI Express bus or another third generation I/O interconnect bus, although the scope of the embodiments are not so limited.

As shown in FIG. 11, various I/O devices 65a (e.g., biometric scanners, speakers, cameras, and/or sensors) can be coupled to the first bus 65, along with a bus bridge 66 which can couple the first bus 65 to a second bus 67. In one embodiment, the second bus 67 can be a low pin count (LPC) bus. Various devices can be coupled to the second bus 67 including, for example, a keyboard/mouse 67a, communication device(s) 67b, and a data storage unit 68 such as a disk drive or other mass storage device which can include code 69, in one embodiment. The illustrated code 69 can implement one or more aspects of the processes described above, including process 300, process 700, and/or process 740. The illustrated code 69 can be similar to the code 42 (FIG. 10), already discussed. Further, an audio I/O 67c can be coupled to second bus 67 and a battery 61 can supply power to the computing system 60. The system 60 can implement one or more aspects of system 100 and/or system 200 as described herein with reference to FIGS. 1 and 2.

Note that other embodiments are contemplated. For example, instead of the point-to-point architecture of FIG. 11, a system can implement a multi-drop bus or another such communication topology. Also, the elements of FIG. 11 can alternatively be partitioned using more or fewer integrated chips than shown in FIG. 11.

Embodiments of each of the above systems, devices, components and/or methods, including the system 10, the semiconductor apparatus 30, the processor core 40, the system 60, system 100, system 200, process 300, process 700, process 740, and/or any other system components, can be implemented in hardware, software, or any suitable combination thereof. For example, hardware implementations can include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of the foregoing systems and/or components and/or methods can be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example 1 includes a computing system, comprising a processor, and a memory coupled to the processor to store instructions which, when executed by the processor, cause the processor to partition a graph into a plurality of clusters comprising batched clusters that support batched data and non-batched clusters that fail to support batched data, establish an execution queue for execution of the plurality of clusters based on cluster dependencies, and schedule inference execution of the plurality of clusters in the execution queue based on batch size.

Example 2 includes the system of Example 1, wherein to partition the graph into a plurality of clusters comprises to identify nodes of the graph as batched or non-batched, wherein each node is identified based on whether a corresponding operation for the respective node supports batched data, generate a batched cluster comprising a plurality of batched nodes based on a relationship between two or more of the batched nodes, and generate a non-batched cluster comprising a plurality of non-batched nodes based on a relationship between two or more of the non-batched nodes.

Example 3 includes the system of Example 2, wherein to generate a batched cluster comprises to add a batched input node to the batched cluster, evaluate output nodes for the batched input node, and add each output node that is a batched node to the batched cluster.

Example 4 includes the system of Example 3, wherein to generate a non-batched cluster comprises to add a non-batched input node to the non-batched cluster, evaluate output nodes for the non-batched input node, and add each output node that is not already part of another cluster to the non-batched cluster.

Example 5 includes the system of Example 1, wherein the instructions, when executed, further cause the processor to generate a set of cluster dependencies, wherein each cluster dependency in the set includes a cluster identifier for a respective first cluster that provides an output and a cluster identifier for a respective second cluster that is dependent on the output of the respective first cluster, and wherein the set of cluster dependencies is used to determine an execution order for the clusters.

Example 6 includes the system of any one of Examples 1-5, wherein the execution queue includes at least one batched cluster and at least one non-batched cluster, and wherein a batched cluster is scheduled for execution in parallel on a batched data set.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to partition a graph into a plurality of clusters comprising batched clusters that support batched data and non-batched clusters that fail to support batched data, establish an execution queue for execution of the plurality of clusters based on cluster dependencies, and schedule inference execution of the plurality of clusters in the execution queue based on batch size.

Example 8 includes the apparatus of Example 7, wherein to partition the graph into a plurality of clusters comprises to identify nodes of the graph as batched or non-batched, wherein each node is identified based on whether a corresponding operation for the respective node supports batched data, generate a batched cluster comprising a plurality of batched nodes based on a relationship between two or more of the batched nodes, and generate a non-batched cluster comprising a plurality of non-batched nodes based on a relationship between two or more of the non-batched nodes.

Example 9 includes the apparatus of Example 8, wherein to generate a batched cluster comprises to add a batched input node to the batched cluster, evaluate output nodes for the batched input node, and add each output node that is a batched node to the batched cluster.

Example 10 includes the apparatus of Example 9, wherein to generate a non-batched cluster comprises to add a non-batched input node to the non-batched cluster, evaluate output nodes for the non-batched input node, and add each output node that is not already part of another cluster to the non-batched cluster.

Example 11 includes the apparatus of Example 7, wherein the logic is further to generate a set of cluster dependencies, wherein each cluster dependency in the set includes a cluster identifier for a respective first cluster that provides an output and a cluster identifier for a respective second cluster that is dependent on the output of the respective first cluster, and wherein the set of cluster dependencies is used to determine an execution order for the clusters.

Example 12 includes the apparatus of any one of Examples 7-11, wherein the execution queue includes at least one batched cluster and at least one non-batched cluster, and wherein a batched cluster is scheduled for execution in parallel on a batched data set.

Example 13 includes the apparatus of Example 7, wherein the logic coupled to the one or more substrates includes transistor channel regions that are positioned within the one or more substrates.

Example 14 includes at least one non-transitory computer readable storage medium comprising a set of instructions which, when executed by a computing system, cause the computing system to partition a graph into a plurality of clusters comprising batched clusters that support batched data and non-batched clusters that fail to support batched data, establish an execution queue for execution of the plurality of clusters based on cluster dependencies, and schedule inference execution of the plurality of clusters in the execution queue based on batch size.

Example 15 includes the at least one non-transitory computer readable storage medium of Example 14, wherein to partition the graph into a plurality of clusters comprises to identify nodes of the graph as batched or non-batched, wherein each node is identified based on whether a corresponding operation for the respective node supports batched data, generate a batched cluster comprising a plurality of batched nodes based on a relationship between two or more of the batched nodes, and generate a non-batched cluster comprising a plurality of non-batched nodes based on a relationship between two or more of the non-batched nodes.

Example 16 includes the at least one non-transitory computer readable storage medium of Example 15, wherein to generate a batched cluster comprises to add a batched input node to the batched cluster, evaluate output nodes for the batched input node, and add each output node that is a batched node to the batched cluster.

Example 17 includes the at least one non-transitory computer readable storage medium of Example 16, wherein to generate a non-batched cluster comprises to add a non-batched input node to the non-batched cluster, evaluate output nodes for the non-batched input node, and add each output node that is not already part of another cluster to the non-batched cluster.

Example 18 includes the at least one non-transitory computer readable storage medium of Example 14, wherein the instructions, when executed, further cause the computing system to generate a set of cluster dependencies, wherein each cluster dependency in the set includes a cluster identifier for a respective first cluster that provides an output and a cluster identifier for a respective second cluster that is dependent on the output of the respective first cluster, and wherein the set of cluster dependencies is used to determine an execution order for the clusters.

Example 19 includes the at least one non-transitory computer readable storage medium of any one of Examples 14-18, wherein the execution queue includes at least one batched cluster and at least one non-batched cluster, and wherein a batched cluster is scheduled for execution in parallel on a batched data set.

Example 20 includes a method comprising partitioning a graph into a plurality of clusters comprising batched clusters that support batched data and non-batched clusters that fail to support batched data, establishing an execution queue for execution of the plurality of clusters based on cluster dependencies, and scheduling inference execution of the plurality of clusters in the execution queue based on batch size.

Example 21 includes the method of Example 20, wherein partitioning the graph into a plurality of clusters comprises identifying nodes of the graph as batched or non-batched, wherein each node is identified based on whether a corresponding operation for the respective node supports batched data, generating a batched cluster comprising a plurality of batched nodes based on a relationship between two or more of the batched nodes, and generating a non-batched cluster comprising a plurality of non-batched nodes based on a relationship between two or more of the non-batched nodes.

Example 22 includes the method of Example 21, wherein generating a batched cluster comprises adding a batched input node to the batched cluster, evaluating output nodes for the batched input node, and adding each output node that is a batched node to the batched cluster.

Example 23 includes the method of Example 22, wherein generating a non-batched cluster comprises adding a non-batched input node to the non-batched cluster, evaluating output nodes for the non-batched input node, and adding each output node that is not already part of another cluster to the non-batched cluster.

Example 24 includes the method of Example 20, further comprising generating a set of cluster dependencies, wherein each cluster dependency in the set includes a cluster identifier for a respective first cluster that provides an output and a cluster identifier for a respective second cluster that is dependent on the output of the respective first cluster, and wherein the set of cluster dependencies is used to determine an execution order for the clusters.

Example 25 includes the method of any one of Examples 20-24, wherein the execution queue includes at least one batched cluster and at least one non-batched cluster, and wherein a batched cluster is scheduled for execution in parallel on a batched data set.

Example 26 includes an apparatus comprising means for performing the method of any one of Examples 20-24.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system, comprising:
a processor; and
a memory coupled to the processor to store instructions which, when executed by the processor, cause the processor to:
  partition a graph into a plurality of clusters comprising batched clusters that support batched data and non-batched clusters that fail to support batched data;
  establish an execution queue for execution of the plurality of clusters based on cluster dependencies; and
  schedule inference execution of the plurality of clusters in the execution queue based on batch size.

2. The system of claim 1, wherein to partition the graph into a plurality of clusters comprises to:
identify nodes of the graph as batched or non-batched, wherein each node is identified based on whether a corresponding operation for the respective node supports batched data;
generate a batched cluster comprising a plurality of batched nodes based on a relationship between two or more of the batched nodes; and
generate a non-batched cluster comprising a plurality of non-batched nodes based on a relationship between two or more of the non-batched nodes.

3. The system of claim 2, wherein to generate a batched cluster comprises to add a batched input node to the batched cluster, evaluate output nodes for the batched input node, and add each output node that is a batched node to the batched cluster.

4. The system of claim 3, wherein to generate a non-batched cluster comprises to add a non-batched input node to the non-batched cluster, evaluate output nodes for the non-batched input node, and add each output node that is not already part of another cluster to the non-batched cluster.

5. The system of claim 1, wherein the instructions, when executed, further cause the processor to generate a set of cluster dependencies, wherein each cluster dependency in the set includes a cluster identifier for a respective first cluster that provides an output and a cluster identifier for a respective second cluster that is dependent on the output of the respective first cluster, and wherein the set of cluster dependencies is used to determine an execution order for the clusters.

6. The system of claim 1, wherein the execution queue includes at least one batched cluster and at least one non-batched cluster, and wherein a batched cluster is scheduled for execution in parallel on a batched data set.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
  partition a graph into a plurality of clusters comprising batched clusters that support batched data and non-batched clusters that fail to support batched data;
  establish an execution queue for execution of the plurality of clusters based on cluster dependencies; and
  schedule inference execution of the plurality of clusters in the execution queue based on batch size.

8. The apparatus of claim 7, wherein to partition the graph into a plurality of clusters comprises to:
identify nodes of the graph as batched or non-batched, wherein each node is identified based on whether a corresponding operation for the respective node supports batched data;
generate a batched cluster comprising a plurality of batched nodes based on a relationship between two or more of the batched nodes; and
generate a non-batched cluster comprising a plurality of non-batched nodes based on a relationship between two or more of the non-batched nodes.

9. The apparatus of claim 8, wherein to generate a batched cluster comprises to add a batched input node to the batched cluster, evaluate output nodes for the batched input node, and add each output node that is a batched node to the batched cluster.

10. The apparatus of claim 9, wherein to generate a non-batched cluster comprises to add a non-batched input node to the non-batched cluster, evaluate output nodes for the non-batched input node, and add each output node that is not already part of another cluster to the non-batched cluster.

11. The apparatus of claim 7, wherein the logic is further to generate a set of cluster dependencies, wherein each cluster dependency in the set includes a cluster identifier for a respective first cluster that provides an output and a cluster identifier for a respective second cluster that is dependent on the output of the respective first cluster, and wherein the set of cluster dependencies is used to determine an execution order for the clusters.

12. The apparatus of claim 7, wherein the execution queue includes at least one batched cluster and at least one non-batched cluster, and wherein a batched cluster is scheduled for execution in parallel on a batched data set.

13. The apparatus of claim 7, wherein the logic coupled to the one or more substrates includes transistor channel regions that are positioned within the one or more substrates.

14. At least one non-transitory computer readable storage medium comprising a set of instructions which, when executed by a computing system, cause the computing system to:
partition a graph into a plurality of clusters comprising batched clusters that support batched data and non-batched clusters that fail to support batched data;
establish an execution queue for execution of the plurality of clusters based on cluster dependencies; and
schedule inference execution of the plurality of clusters in the execution queue based on batch size.

15. The at least one non-transitory computer readable storage medium of claim 14, wherein to partition the graph into a plurality of clusters comprises to:
identify nodes of the graph as batched or non-batched, wherein each node is identified based on whether a corresponding operation for the respective node supports batched data;
generate a batched cluster comprising a plurality of batched nodes based on a relationship between two or more of the batched nodes; and
generate a non-batched cluster comprising a plurality of non-batched nodes based on a relationship between two or more of the non-batched nodes.

16. The at least one non-transitory computer readable storage medium of claim 15, wherein to generate a batched cluster comprises to add a batched input node to the batched cluster, evaluate output nodes for the batched input node, and add each output node that is a batched node to the batched cluster.

17. The at least one non-transitory computer readable storage medium of claim 16, wherein to generate a non-batched cluster comprises to add a non-batched input node to the non-batched cluster, evaluate output nodes for the non-batched input node, and add each output node that is not already part of another cluster to the non-batched cluster.

18. The at least one non-transitory computer readable storage medium of claim 14, wherein the instructions, when executed, further cause the computing system to generate a set of cluster dependencies, wherein each cluster dependency in the set includes a cluster identifier for a respective first cluster that provides an output and a cluster identifier for a respective second cluster that is dependent on the output of the respective first cluster, and wherein the set of cluster dependencies is used to determine an execution order for the clusters.

19. The at least one non-transitory computer readable storage medium of claim 14, wherein the execution queue includes at least one batched cluster and at least one non-batched cluster, and wherein a batched cluster is scheduled for execution in parallel on a batched data set.

20. A method comprising:
partitioning a graph into a plurality of clusters comprising batched clusters that support batched data and non-batched clusters that fail to support batched data;
establishing an execution queue for execution of the plurality of clusters based on cluster dependencies; and
scheduling inference execution of the plurality of clusters in the execution queue based on batch size.

21. The method of claim 20, wherein partitioning the graph into a plurality of clusters comprises:
identifying nodes of the graph as batched or non-batched, wherein each node is identified based on whether a corresponding operation for the respective node supports batched data;
generating a batched cluster comprising a plurality of batched nodes based on a relationship between two or more of the batched nodes; and
generating a non-batched cluster comprising a plurality of non-batched nodes based on a relationship between two or more of the non-batched nodes.

22. The method of claim 21, wherein generating a batched cluster comprises adding a batched input node to the batched cluster, evaluating output nodes for the batched input node, and adding each output node that is a batched node to the batched cluster.

23. The method of claim 22, wherein generating a non-batched cluster comprises adding a non-batched input node to the non-batched cluster, evaluating output nodes for the non-batched input node, and adding each output node that is not already part of another cluster to the non-batched cluster.

24. The method of claim 20, further comprising generating a set of cluster dependencies, wherein each cluster dependency in the set includes a cluster identifier for a respective first cluster that provides an output and a cluster identifier for a respective second cluster that is dependent on the output of the respective first cluster, and wherein the set of cluster dependencies is used to determine an execution order for the clusters.

25. The method of claim 20, wherein the execution queue includes at least one batched cluster and at least one non-batched cluster, and wherein a batched cluster is scheduled for execution in parallel on a batched data set.

* * * * *